(12) United States Patent
Per et al.

(10) Patent No.: US 8,069,320 B1
(45) Date of Patent: *Nov. 29, 2011

(54) SYSTEM AND METHOD FOR CONSOLIDATION OF BACKUPS

(75) Inventors: Yuri S. Per, Moscow (RU); Maxim V. Lyadvinsky, Moscow (RU); Serguei M. Beloussov, Singapore (SG); Juri V. Tsibrovski, Moscow (RU)

(73) Assignee: Acronis Inc., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/084,479

(22) Filed: Apr. 11, 2011

Related U.S. Application Data

(63) Continuation of application No. 12/048,580, filed on Mar. 14, 2008, now Pat. No. 7,934,064, which is a continuation-in-part of application No. 11/016,727, filed on Dec. 21, 2004, now abandoned.

(60) Provisional application No. 60/894,923, filed on Mar. 15, 2007.

(51) Int. Cl.
*G06F 12/00* (2006.01)
(52) U.S. Cl. ......... 711/161; 711/162; 707/641; 707/646
(58) Field of Classification Search .................. 711/161, 711/162; 707/641, 646
See application file for complete search history.

(56) References Cited

U.S. PATENT DOCUMENTS

| | | | |
|---|---|---|---|
| 6,959,368 B1 * | 10/2005 | St. Pierre et al. | 711/162 |
| 7,266,655 B1 * | 9/2007 | Escabi et al. | 711/162 |
| 7,444,485 B1 * | 10/2008 | St. Pierre et al. | 711/162 |
| 7,694,088 B1 * | 4/2010 | Bromley et al. | 711/162 |
| 2007/0033376 A1 * | 2/2007 | Sinclair et al. | 711/203 |

* cited by examiner

*Primary Examiner* — Matthew Bradley
(74) *Attorney, Agent, or Firm* — Bardmesser Law Group

(57) ABSTRACT

A system, method and computer program product for consolidation of backups, wherein each backup includes data and a backup map with offsets that point to data of current and/or previous backups, including selecting a plurality of backups to be consolidated; combining the offsets in the backup maps of the selected backups into a single set of offsets; consolidating the selected backups to a new backup that contains the latest data from the selected backups, the latest data determined based on the offsets in the single set; updating the offsets in the single set to point to the data in the new backup; and storing the updated offsets in the new backup as part of a backup map of the new backup. The selected backups comprise one initial full backup and at least one backup. In the combining step, the addresses from the backup maps of first backup of the selected sequence of backups up to the last created backup is checked. The selected backups are organized into a tree.

20 Claims, 7 Drawing Sheets

SYSTEM AND METHOD FOR CONSOLIDATION OF BACKUPS

CROSS REFERENCE TO RELATED APPLICATIONS

This application is a continuation of U.S. patent application Ser. No. 12/048,580, now U.S. Pat. No. 7,934,064 filed on Mar. 14, 2008, which is a continuation-in-part of U.S. patent application Ser. No. 11/016,727, now abandoned filed Dec. 21, 2004, entitled SYSTEM AND METHOD FOR INCREMENTAL BACKUP OF LOCAL DRIVE DATA, and is a non-provisional of U.S. Provisional Patent Application No. 60/894,923, filed on 15 Mar. 2007, entitled SYSTEM AND METHOD FOR CONSOLIDATION OF INCREMENTAL BACKUPS, which are both incorporated herein by reference in their entirety.

BACKGROUND OF THE INVENTION

1. Field of the Invention

The present invention relates to consolidation of backups.

2. Background Art

Conventional methodology for updating archived data using incremental backups typically uses an initial backup, such as a backup of data from a data storage device, and some incremental backups. The initial backup stores initial data, i.e., data that was backed up during the first data archiving. Incremental backups store only data that changed on the storage device since the previous incremental backup. Every incremental backup can be represented by a file, so as time goes by, and with frequent archiving, there are numerous such files that need to be stored on the disk, and the disk storage space occupied by such files increases constantly. In most cases, a lot of old restoration points are not needed, e.g., a critical time for a local machine, server, etc., has passed, and the data chunk at this point in time is no longer needed. However deleting some backup files is often not possible, because all data backed up within it will be lost, and restoration of the next backup cannot be performed, since the next backup can consist of links to the data stored in the previous backup(s). Thus, the entire subsequent series of the backups can be corrupted, and data cannot be restored in those cases.

Accordingly, there is a need in the art for a more efficient method of backup consolidation.

SUMMARY OF THE INVENTION

The present invention relates to consolidation of backups that substantially obviates one or more of the disadvantages of the related art.

In one aspect, there is provided a system, method and computer program product for consolidation of incremental backups, wherein each incremental backup includes data and a backup map with links that point to data of current and/or previous backups, including selecting a plurality of incremental backups to be consolidated; combining the links in the backup maps of the selected backups into a single set of links; consolidating the selected backups to a new backup that contains the latest data from the selected backups, the latest data determined based on the links in the single set; updating the links in the single set to point to the data in the new backup; and storing the updated links in the new backup as part of a backup map of the new backup.

The incremental backups are block-level backups or file-level backups. The selected backups comprise one initial full backup and at least one incremental backup. The backup map is based on block structure of a hard disk drive. In the combining step, the addresses from the backup maps of first backup of the selected sequence of backups up to the last created backup is checked. The selected incremental backups are organized into a tree. The incremental backups are stored as a set of files on a storage device. The storage device can be a hard disk drive, an optical drive, a tape and a network storage element.

The set of links is generated based on a tree structure of the incremental backups. For additional incremental backups that are not part of the selected backups but contain links that point to the selected backups, updating the links in the backup maps of the additional backups. At least some of the incremental backups are deleted, as part of the consolidation process. An additional backup is created, that is part of a new incremental backup that contains the latest data and which contains a set of links identifying a correspondence between old links and current links.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 1 describes a structure of backed up data before consolidation of backups.

DETAILED DESCRIPTION OF EMBODIMENTS OF THE INVENTION

Reference will now be made in detail to embodiments of the present invention, examples of which are illustrated in the accompanying drawings.

The present invention is related to a utility for the consolidation of backups.

Figure 1:
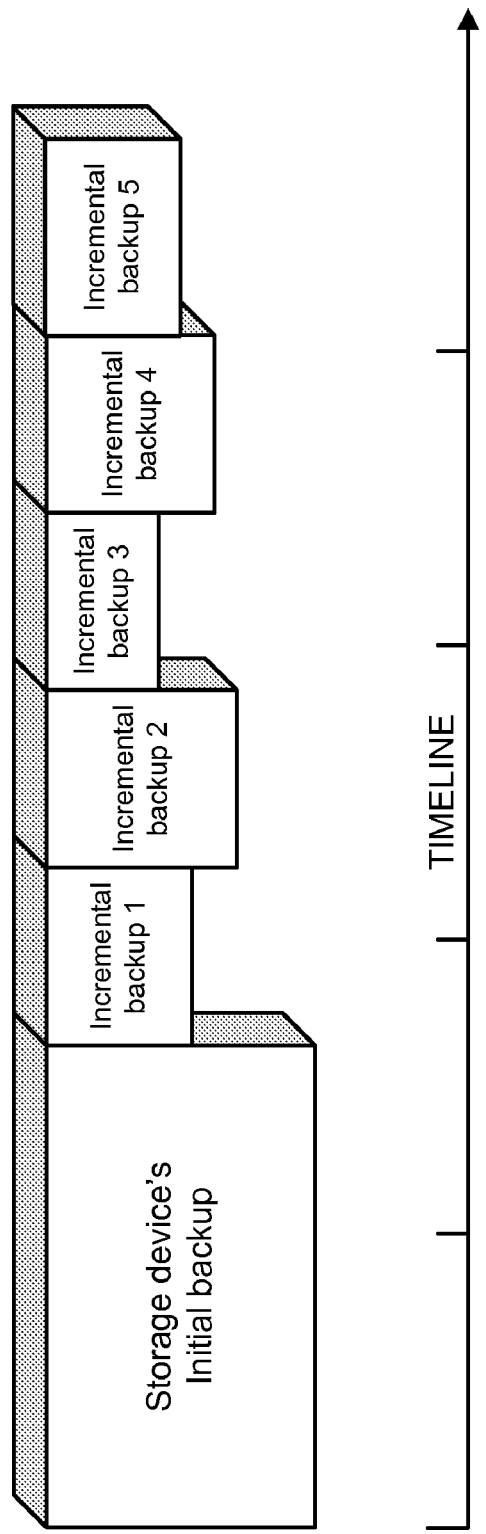

FIG. 1 describes a structure of backed up data before the consolidation of backups. The timeline reflects moments when incremental backups were created. In this example, the storage device full backup is the initial backup, and subsequent backups are incremental backups.

When an incremental backup is created, a bitmap of the data chunk stored in the backup can be generated. For example, it can be a bitmap of data blocks (or data chunks) that are subject to archiving, or a bitmap of used data blocks of the hard disk drive (i.e., blocks or sectors of the hard disk drive that contain useful data, rather than "empty" blocks and sectors, or free blocks). As used herein, a "chunk" is a logical unit for backup, such as a file, a part of file, a group of files, a group of blocks, a group of data storage device's sectors, and so on.

During archiving of the data storage device, a comparison of the data on the storage device and previously backed up data can be performed. If the data blocks or files correspond to each other, the bit in the bitmap corresponding to this data chunk bit is cleared.

Also note that the backed up data chunks in the backup can have the various length (size). Furthermore, the bitmap can be used to archive the data chunk marked in the bitmap, in addition to a previously created backup.

The backup (initial backup or incremental backup) may consist of: a header of the backup, the backup map and actual data from the data storage device. The data chunk on the storage device might not be backed up in the new incremental backup if it coincides with the backed up data chunk in the previous incremental backup.

The data chunk stored in the backup can consist of the data of the data storage device of various types, for example, it can consist from: data blocks of the data storage device, data from the data storage device, which belongs to a file, or directory, or files and directories themselves, or other type of data. Also, the data chunk can include metadata, which is necessary to work with the backup, for operating with the chunks within backups. Also backup maps (or parts of them) can be a part of the data chunk.

The link to the data chunk in the new backup map is included. For example, the address of this data chunk in the previous backup is copied from the previous incremental backup map into the corresponding link of the new incremental backup map. Also, the offset of this data chunk in the previous backup is recorded in the corresponded link for this data chunk, instead of the address of data chunk. In other words, several backup link schemes are possible. For example, (1) a through numbering scheme, where chunk numbering in the second backup continue based on the address of the last byte of the last chunk in the previous backup. Another option is (2) where each backup has its own chunk numbering, independent of other backups, so that each link has "backup number, chunk address" included in it. As another option, (3), where, in the current backup 2 the chunk is not backed up, since it is the same as the chunk in the prior backup 1, then the link, instead of the address of the chunk in backup 2 has an identifier that refers to the map in backup 2, which in turn refers to the chunk at issue—this avoid having to change the link to this chunk during consolidation, since the link has no address that can change during the consolidation, but only an identifier, which will not change.

The data chunk on the storage device can be backed up to a new incremental backup if it does not coincide with the backed up data chunk in the previous incremental backup.

In an exemplary embodiment, a user or a scheduler or other software asks the system to delete unnecessary backups (such as out-of-date backups, or those no longer necessary), for example the incremental backup 2. In that case, data chunks from the incremental backup 2 and from the incremental backup 3 must be consolidated, and after the consolidation, the incremental backup 2 can be deleted.

In an exemplary embodiment, the incremental backup 2 is selected for deletion (the incremental backup 2 and the incremental backup 3 are selected for the consolidation). That means that the new incremental backup will be created, instead the incremental backup 2 and the incremental backup 3, so the latest data chunks and metadata (with the links updated) from the incremental backup 2 and the incremental backup 3 are moved (copied) to the new incremental backup.

In another embodiment, the data and metadata in the incremental backup 3 can be updated by the data from the incremental backup 2 with the links update, and the incremental backup 2 can be deleted.

Figure 2:
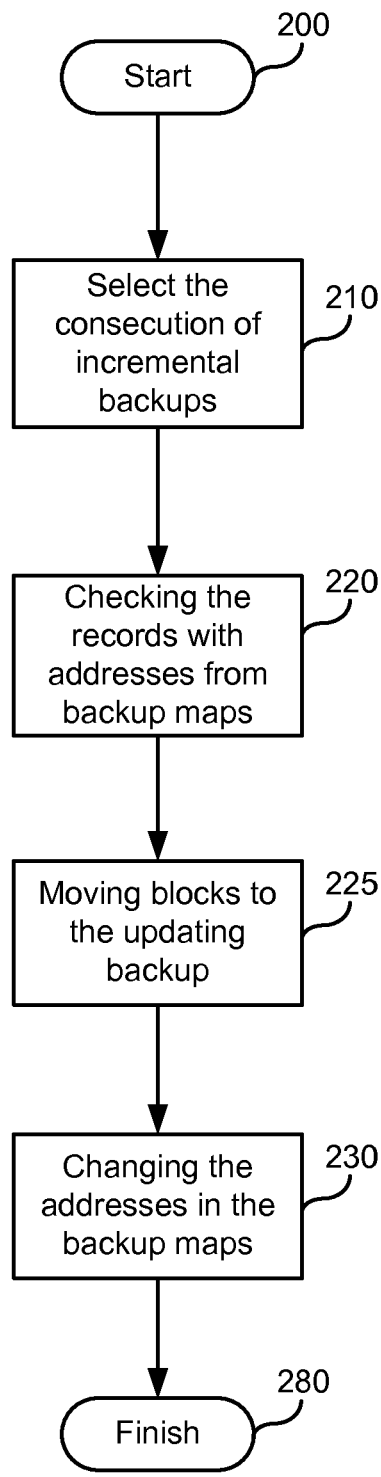
FIG. 2 illustrates the basic procedures for implementing the present invention.

FIG. 2 illustrates the basic procedures for implementing backup consolidation. As shown in FIG. 2, the process starts in step 200, for example, when a user intends to consolidate several backups into one, or scheduler or some other software asks the system for consolidation. The set of incremental backups for the consolidation in step 210 may be identified. Note that the only one set of backups selected for the consolidation is illustrated, nevertheless backups without close relation can be consolidated also.

After the set of incremental backups for consolidation is selected, the links from all the backup maps are combined into a single set of links in step 220, so multiple links are stored in the set of links.

Also note that, in case special identifiers of data chunks in the backups are used, then only links from the selected for the consolidation backups can be combined, with the exception of links from the backups, which will be deleted during (or after) the consolidation.

In step 225, the latest data chunks from selected set of backups are moved to a new backup based on the links in the single set of links. As data chunks from the backups selected for consolidation can be moved in to the new incremental backup, than their positions in the new backup can change during the consolidation process. Note that the position/placement of the moved data can change relative to the order of links selection from the set of links. So an update of the links (to reconcile them with the moved data chunks) in the new backup map can be performed, and the links will point to new positions of data chunks in the new backup.

Note, that the process 225 can be started after the start of process 220, i.e., the process of moving data chunks to the new backup (with links' updating) can be performed during the process of combining of links in the set of links.

Note that the links in the data chunk can be arranged in any order of their placement in the data chunk. Also note that the set of links can be stored in the memory, on the any data storage device.

In step 280 the process of consolidation is finished.

Figure 3:
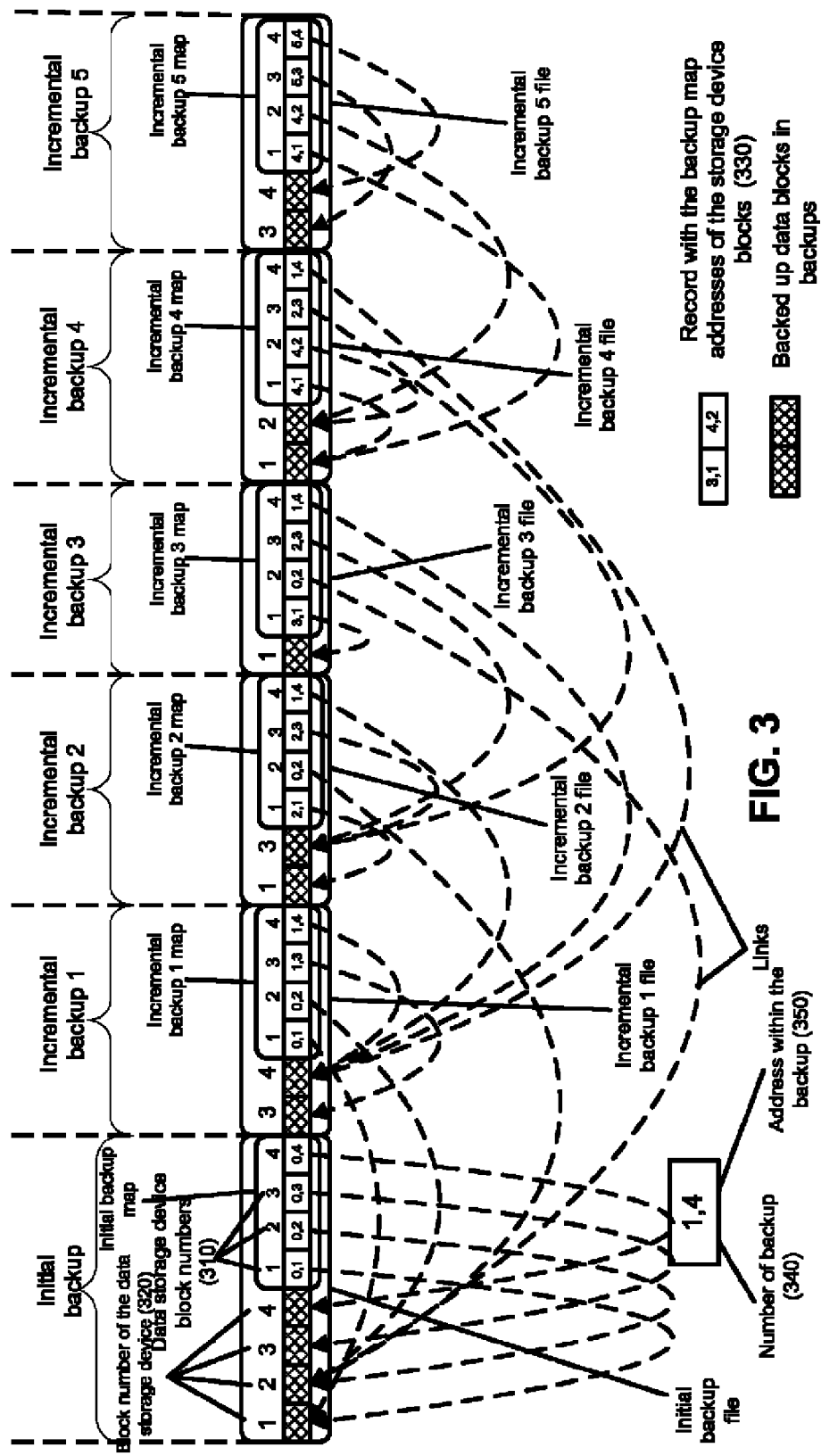
FIG. 3 illustrates an internal structure of the backups before the backup consolidation.

FIG. 3 illustrates an internal structure of the backups before the backup consolidation according to the present invention.

In this case, an archive consists from the initial backup (310) and five incremental backups: incremental backup 1 (320), incremental backup 2 (330), incremental backup 3 (340), incremental backup 4 (350) and incremental backup 5 (350). The initial backup 310 stores initial data, i.e., data which was backed up during the very first backup. An initial backup 310 can be a backup of selected data from the area on the disk storage, can be a partial archive, a full disk storage archive, an image of the disk storage device, can consist of files and directories, etc. The incremental backup stores only data that have changed since the previous backup. In this embodiment, the incremental backup 5 is the last created incremental backup. Every backup can be presented as at least one file.

The initial backup and incremental backups can include the backup maps (312, 322, 332, 342, 352, 362). Backup maps include links (370), which point to the data chunk in the initial and/or the incremental backup(s), and which can be used to find a data chunk in the backups, for example, during the process of restoration, during the consolidation process, or like. Note that the links 370 in the backup map can be stored in various forms, for example, a backup can have the transparent (through) numeration, so in the first incremental backup numeration of the stored data can start not from the zero, but can continue from the initial backup, so links can be based on a backup identifier and a global offset address. Also, links 370 can include not only a start address of the backed data chunk, but a start address of the backed data chunk and a length (size) of the data chunk, to which this link points. Note that the data chunk can have, for example, a pointer to the end of data chunk, which can point, that in this point the data chunk is ended, so including the length of a data chunk is not always necessary in the links.

Also note that a data chunk can have its own identifier, which can identify to which backup this data chunk belongs so a link to this data chunk in backups and to the backup maps can be used.

In this embodiment, a link 370 can have a number of the backup 372, in which the data chunk is stored, and an address 374 of the data chunk in this backup, or the offset address to the data chunk from the start of this backup (or offset to the data chunk from the start of initial backup, for example, the first created backup, in case of through/transparent numbering), or other identifiers of the data chunk placement in the backups.

Note that each backup map may contain any secondary information required for operation with backups, or data within them, for example, for restoration and consolidation of the data being backed up. During the backup creation, the backup map can be created, or it can be created after the creation of the backup.

Figure 4:
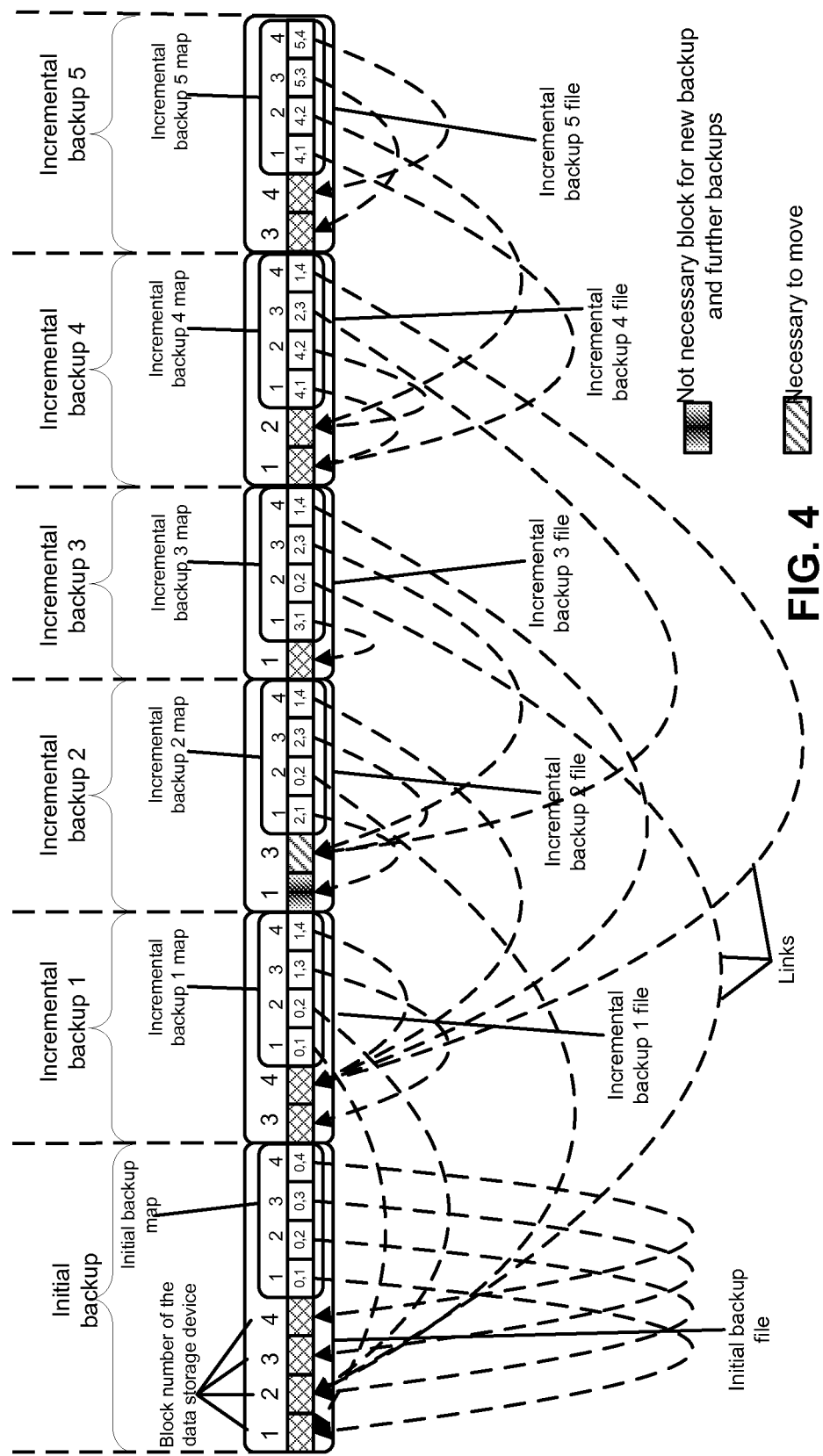
FIG. 4 illustrates an internal structure of the backups during the process of backup consolidation.

FIG. 4 illustrates an internal structure of the backups during the process of backup consolidation according to the present invention. In an exemplary embodiment, incremental backup 2 and incremental backup 3 are selected for the consolidation (or incremental backup 2 is selected for deletion). After the set of backups for consolidation is selected (or backups for deletion are selected), the links from the backup maps are combined into the simple set of links, with the exception of links from the backup that will be deleted.

Note that the link can identify location of data chunk that belongs to data storage elements, for example, to files, directories, data storage device blocks or sectors. The backup can include a list of backed up (stored) elements, for example, a list or tree of the backed files or/and directories for the file-level backup, or numbers of backed data storage device blocks for the block-level backup, to which are attached (or with which are stored, or which have in it) links to stored for them data chunks. In other words, when files are backed up using a file-based backup, then the backup needs to include a list of files and directories (or directory tree) that are being backed up, so that it is possible to later know what needs to be restored, and to where. The backed up data (in the form of chunks) are represented by linked objects (files or directories) in this list (or tree). E.g., file "asd", and next to it "1,2,3"—to restore the file "asd", it is necessary to unpack the chunks 1, 2, 3 to the HDD. In the case of a disk backup, the backup also includes a record that defines the number of sectors in the chunk, so that it is possible to know the size of each backed up chunk. For example, in the chunk 1, where 5 sectors correspond to each chunk, the first chunk will have 5 sectors restored, the second chunk will have sectors 6-10 restored, and so on.

Then, links from the backups maps are combined into a simple set of links, these links can be selected in any order and data chunks corresponding to them are moved from the backups selected for consolidation to the new backup. Thus, only latest data chunks from selected set of backups are moved to the new backup.

Note that the backup maps are also moved to the newly created backups, with the updated links for the data chunks from the backups selected for consolidation.

The process of moving the data to the new backup can begin from the first link in the set of links, for example, links from the incremental backup 3 map 340 (the last incremental backup in the set of backup for the consolidation). First, link (446) in the incremental backup 3 map 340, points to the first data chunk (444) of the incremental backup 3. It means that this data chunk (444) was backed up in incremental backup 3 (340) during creation of incremental backup 3 to the extent that this data chunk (444) on the data storage device did not coincide with the backed up data chunk (334) in the incremental backup 2 (330). So the first data chunk (334) from the incremental backup 2 (330) will not be needed for the "updated incremental backup 3", because it does not link to this data chunk. Also the first data chunk (344) of the incremental backup 3 (340) will be added to the updated incremental backup 3 (540 in FIG. 5). The first link (446) in the incremental backup 3 map (332) is valid for the updated incremental backup 3 (540 in FIG. 5), and the first link in the updated incremental backup 3 map (542 in FIG. 5) is not necessary to update for the previously chosen type of links above. In this case, option (2) is chosen, of the 3 options discussed above, so that when the new backup is created, the link points to where it needs to point—there is no need to change it. For other types of links, the updating of links can be performed, because a position of the moved data chunk for the chosen link can differ from its previous position in non consolidated backups.

The term "updated incremental backup" refers to the last incremental backup from the selected set of backups for consolidation, where latest data chunks from selected set of backups for consolidation are moved. Note that a new incremental backup can be created, instead of updating incremental backup 3, so at least one file (in the case where each backup is stored as a single file) of the incremental backup can also be created.

Also note that the numbering of incremental backups can change, so, for example, updated incremental backup 3 can become an incremental backup 2, and incremental backup 4 can become incremental backup 3, and so on, after the consolidation. Or, alternatively, there can be no numbering of the backups at all. The second link in the incremental backup 3 map (342) points to the second data chunk of the initial backup (310).

Also note, that the link can point not only to set of stored (backed up) data in the initial backup, but also to the data chunk in the backups, or the last created backup(s). This means that this data chunk was not backed up in the incremental backup 1 (320), in the incremental backup 2 (330) and in the incremental backup 3 (340) during the creation of the incremental backups, since this data chunk on the storage device completely coincided with the backed up data chunk in the initial backup (310). So in the second record in the incremental backup 3, the map (342) is valid for the updated (new) incremental backup 3 (540 in FIG. 5).

Figure 5:
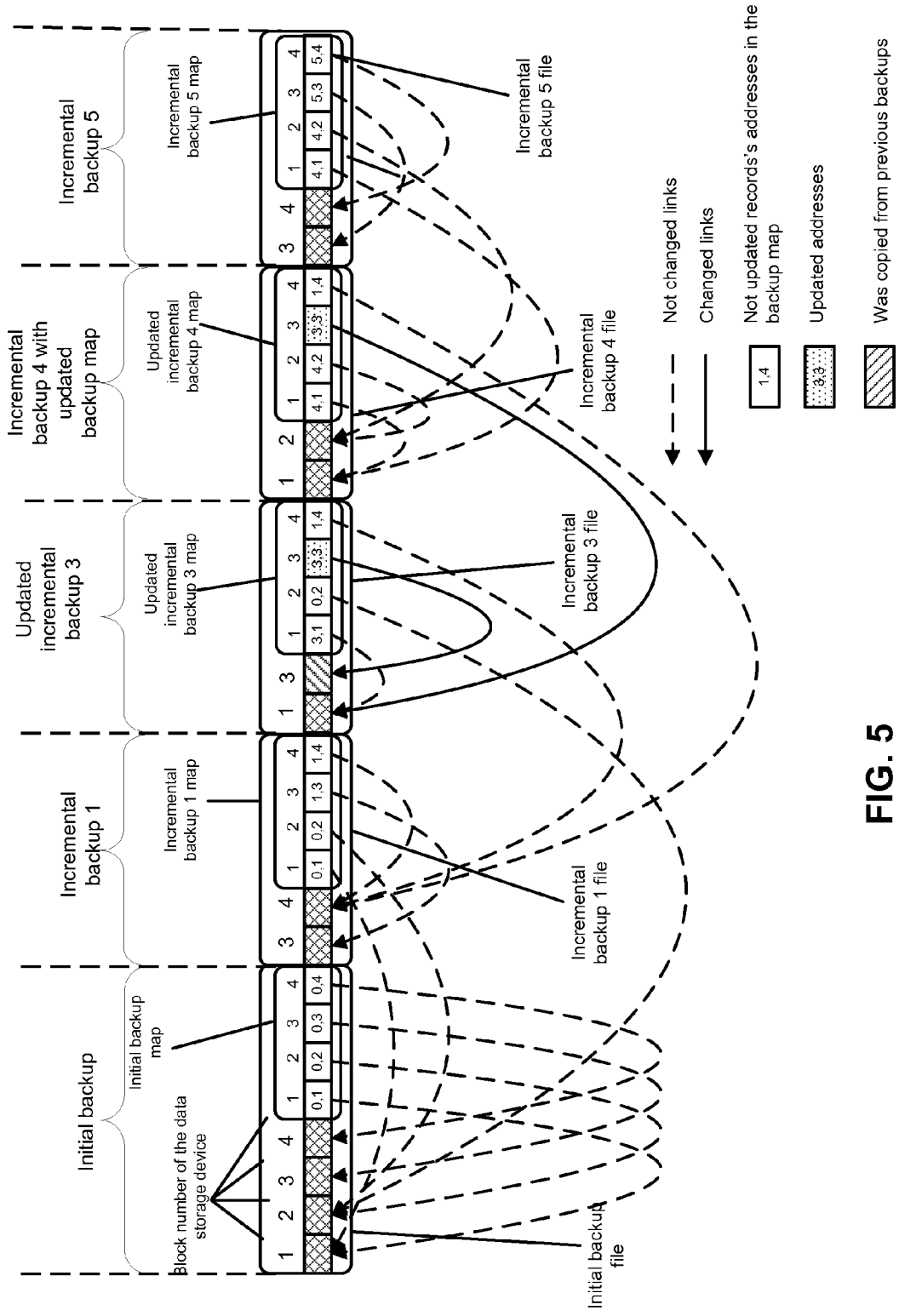
FIG. 5 illustrates an internal structure of the backups after the backup consolidation.

The third link in the incremental backup 3 map (342) points to the second data chunk (336) in the incremental backup 2 (330), so the second data chunk (438) from the incremental backup 2 (330) will be moved to the updated (new) incremental backup 3 (540 in FIG. 5). And the third link (448) in the incremental backup 3 map (342) will be updated to the link of the new position of the moved second data chunk (436) in the updated incremental backup 3 (540 in FIG. 5).

The fourth link in the incremental backup 3 map (342) points to the second data chunk in the incremental backup 1 (320). So this link is valid for the updated incremental backup 3 (540 in FIG. 5).

After all the data chunks for the links (of the incremental backup map 3) from the set of links are moved to the new incremental backup 3 (540 in FIG. 5), then the next link from the set of links is selected for further processing.

Links in the next incremental backup maps (in this case, incremental backup 4 map (352) and incremental backup 5 map (362)) can point to the data chunks in the previous incremental or/and initial backups. So links in next incremental backups maps (352, 362) are updated to links of the corresponding data chunks in the updated incremental backup (for example, in the updated incremental backup 4 map 552), if necessary, because all the latest required data chunks (from the selected for consolidation set of backups) are moved to the updated incremental backup 3 (540 in FIG. 5). The third link (458) in the incremental backup 4 map (352), which points to the second data chunk in the incremental backup 2 (330), will be updated to the link of the new position of the moved second data chunk (448) in the incremental backup 4 map (552 in FIG. 5) of the incremental backup 4 (550 in FIG. 5).

Links in the next incremental backup's maps (in this case, incremental backup 4 map (352) and incremental backup 5 map (362)) do not need to point to the data chunk in the previous backups. These links can remain without updating, e.g., first, second, fourth links in the incremental backup 4 map (352), and from the first up to fourth links in the incremental backup 5 map (362).

Also note that incremental backups, which were created before the first incremental backup from the selected sequence of incremental backups for consolidation, do not change, since these backups do not have any links (addresses) to data blocks of the selected sequence of incremental backups, so these links will be correct.

Also note that the re-archiving of some backups can be performed, for example, in case, when the backups have a transparent (through) numbering, so old links might not be correct. Also note that all backups can be re-archived, if it is not possible to perform a consolidation without them. Note that addresses of data block can be represented in any form, such as offsets, direct links, etc.

In another embodiment of the invention, all backups can have a through/transparent numbering of data in the backups, so all backups (with the possible exception of backups prior to the set of backups to be consolidated) can be recreated in new backup, since offsets of the data can be changed during or after the process of consolidation. So, for example, if each backup is represented by one file, then a new file for each backup (with the exception of backups to be deleted) can be created, and links in these backups can be updated according to new location of data chunks in the new backups.

Also note that not only incremental backups can be used for the consolidation, but differential backups can be used to, since they also have links in the backup maps similar to links in the incremental backups maps.

FIG. 5 illustrates an internal structure of the backups after the backup consolidation according to the present invention. As shown in FIG. 5, incremental backup 3 (340), including its corresponding backup map (542), is updated into the updated (new) incremental backup 3 (540). Note that the incremental backup 4 map (552) is also updated. But the initial backup, the incremental backup 1, the incremental backup 2 and the incremental backup 5, including their corresponding backup maps, do not need to be updated. In a common case, all backup maps in the incremental backups after the selected sequence of backups for consolidation are updated because at least one data chunk in the next backup differs from the previously created backup. And the incremental backup 4 map is updated, but there are no moved data chunks from the previous backups.

Note that in case of a mounted virtual storage device and virtual storage device backups are created, then incremental virtual storage device backups can also be consolidated.

Figure 6:
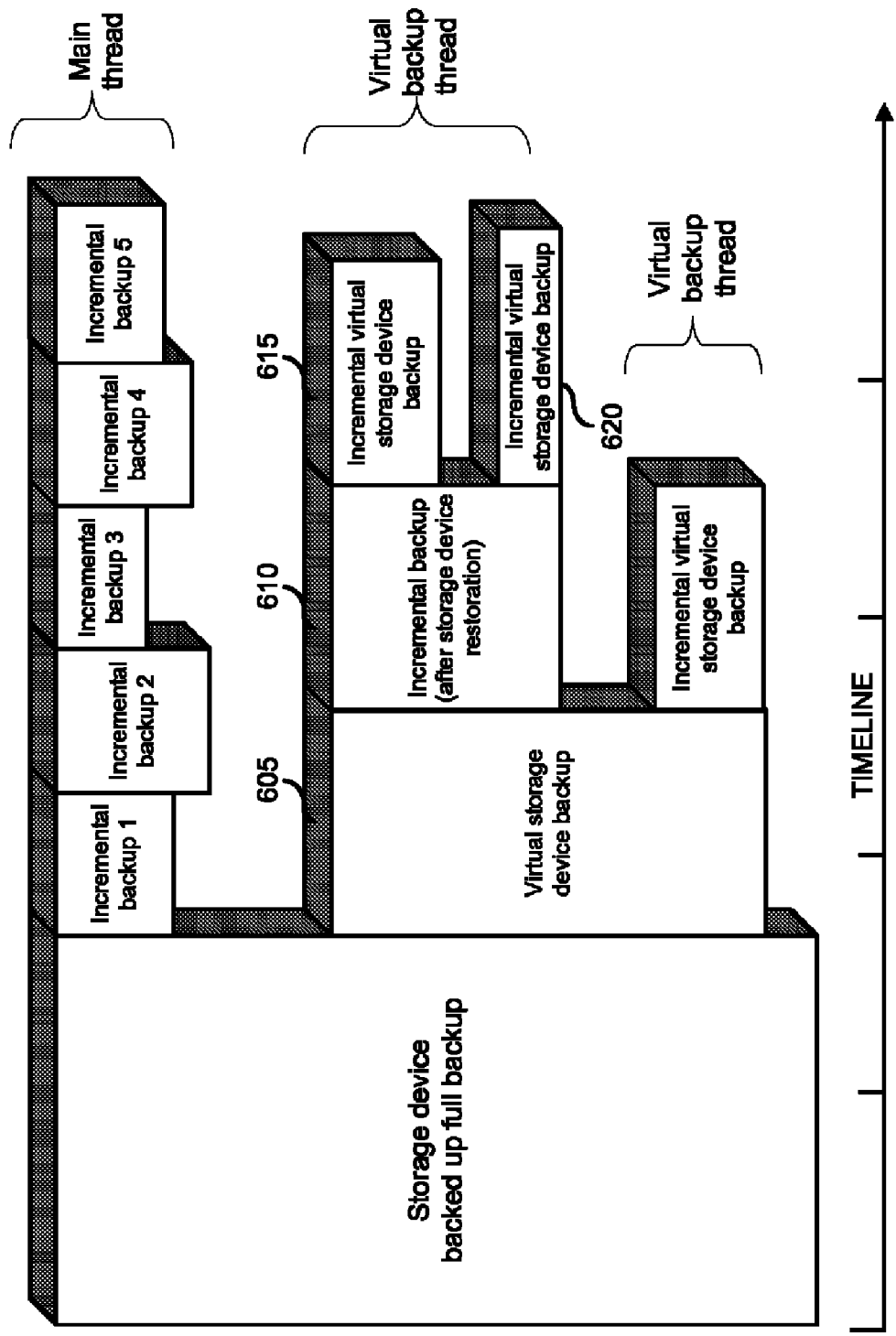
FIG. 6 illustrates an archive structure of one embodiment of the invention with a "Christmas tree" incremental backup structure.

FIG. 6 illustrates an archive structure where some of the archiving is done without restoring, which means that the incremental backups are virtual backups that have been done without a full restoration of the archived data. In other words, FIG. 6 illustrates an archive structure of one embodiment of the invention with a "Christmas tree" incremental backup structure. The backup and restore processes are described in the U.S. patent application Ser. No. 11/016,727, filed Dec. 21, 2004, entitled SYSTEM AND METHOD FOR INCREMENTAL BACKUP OF LOCAL DRIVE DATA, incorporated herein by reference.

The timeline reflects moments when incremental backups were created. The storage device full backup is the initial backup for further incremental backups. There are two types of incremental backups:

(1) real incremental backups (representing a real state of the storage device), and (2) virtual incremental backups (created using the approach described herein).

It should be noted that incremental backups may be dependent on either virtual backups or real backups or even on backups of other storage devices, where the same content may be found. In the latter case, an incremental backup may depends on multiple backups, where similar content is stored.

Since device backing up can be performed relative to any point in time, the subsequent incremental backup should be added with the link to previously formed corresponding backups. Thus, a "Christmas tree" incremental backup structure can be created. In some cases when incremental backup uses more than one backup as a base, a more intricate graph may be formed, with branches not only above but below some of the incremental backups.

In some cases, different backups may be stored as separate files or structures. Also, it possible to implement backup in the form of a single file or archive whose contents represents a tree or a linear structure that in turn represents various incremental backups at various points in time or incremental backups representing different storage devices or even different computing systems. Such a tree structure, an example of which is illustrated in FIG. 6, permits restoration of the state of the file system, or of the HDD content, as they existed at multiple points in the timeline.

In another exemplary embodiment of the present invention, a method of updating an archive includes mounting a full access virtual storage that combines a full access temporary storage and a READ-only image of a data storage, wherein the image uses the archive as a source; generating a bitmap of elementary blocks of the virtual storage with all the blocks being initially marked; redirecting virtual storage write requests of a user application to the temporary storage and unmarking corresponding blocks in the bitmap; redirecting, to the image, virtual storage read requests of a user application for marked blocks; redirecting, to the temporary storage, virtual storage read requests of a user application for unmarked blocks; and incrementally archiving changed data from the temporary storage to the archive. The archive can include a backup of blocks of a storage device, or a snapshot of the storage device and subsequent incremental backups.

The backup can be a tree backup structure. The archive can include a backup of a set of files stored in a storage device. The set of files can be represented by at least one folder. The method can further update the archive that is simultaneously used by different applications using a plurality of temporary storage using concurrent access to the image while updating a plurality of virtual storages. The different applications can run in different operating environments. The different operating environments exist in different hardware systems. The blocks of the temporary storage are "write-once-read-many times" blocks. The incremental backups permit formation of the tree backup scheme.

The method can also include creating the archive on any of a hard disk drive, an optical drive, a tape and a network storage element. The virtual storage can correspond to a file structure.

In this embodiment, virtual storage is used that, when mounted (i.e., made accessible), is divided into two parts. One part is an image of a data structure being backed up. Such a data structure may be the content of a hard disk drive (HDD), a file structure along with the file's data, or any other data set that has internal order. The backed up data may correspond to the hard disk drive content as it existed at some predefined point in time, or an archive that was processed previously by the procedure described in the present invention.

It should be noted that some of the original data of the source structure may be discarded or ignored while creating an archive. Such data can have gaps at the end of files, swap or paging files, hibernation files, copy-protected files, and unused blocks of a disk drive or disk partition. This data may be discarded while archiving either the block structure (e.g., disk drive content) or file structure.

The second part of virtual storage is an intermediate or temporary storage that reflects the changes that are being currently made to the data from the image. In other words, temporary storage blocks are used as a full access partition of a virtual storage. In this manner, allocations of the blocks with the latest version are reflected. Thus, any WRITE requests can be addressed to the temporary storage, instead of being addressed to the storage structure restored from the archive. The data from the temporary storage can then be used as a source data for backing up or archiving in common with the source archive. In other words, the archive represents a disk snapshot, while data from the temporary storage can be used together with the archive, since the data in the temporary storage represents only the incremental changes. The image, on the other hand, is generally treated as "READ-only" structure.

Thus all changes or edits to the files or other data structures in the archive being affected by a user application can be registered and treated in the virtual storage as a real source of data, previously used for archiving.

The updating of the archive can be done, for instance, as a background process, from the temporary storage to the archive. In such a case, an incremental part of the archive may be used as the temporary storage. As a further option, it is possible to treat the backup as an online backup, as further described in related application Ser. No. 10/925,928; Filed: Aug. 26, 2004, entitled: SYSTEM AND METHOD FOR USING FILE SYSTEM SNAPSHOTS FOR ONLINE DATA BACKUP, which is incorporated by reference herein in its entirety.

One option is to copy the temporary storage to the storage of the image in an online (background) manner. Another option is to suspend write operations to the temporary storage, and then to copy its contents to the image.

Thus, the discussion herein is primarily directed to the interaction between five elements:

(a) an archive, which represents a snapshot of the data structure, and, optionally, predefined incremental add-ons handled simultaneously with the initial snapshot.

(b) an image, which represents a virtual read-only disk, corresponding to some "original" state of the data structure, represented by the archive and by the increments, if any.

(c) temporary storage (in effect, a buffer with random access) that records all additions and changes to the data structure, initially represented by the image so that user applications can recognize the unchanged blocks of initial structure, represented by the archive.

(d) an increment that is added to the archive either when the user application finishes its work (in other words, based on the activity of the user application), or in an on-line regime. In the latter case, the temporary storage is only needed to perform full access to the virtual storage that is initially represented by the image.

Figure 7:
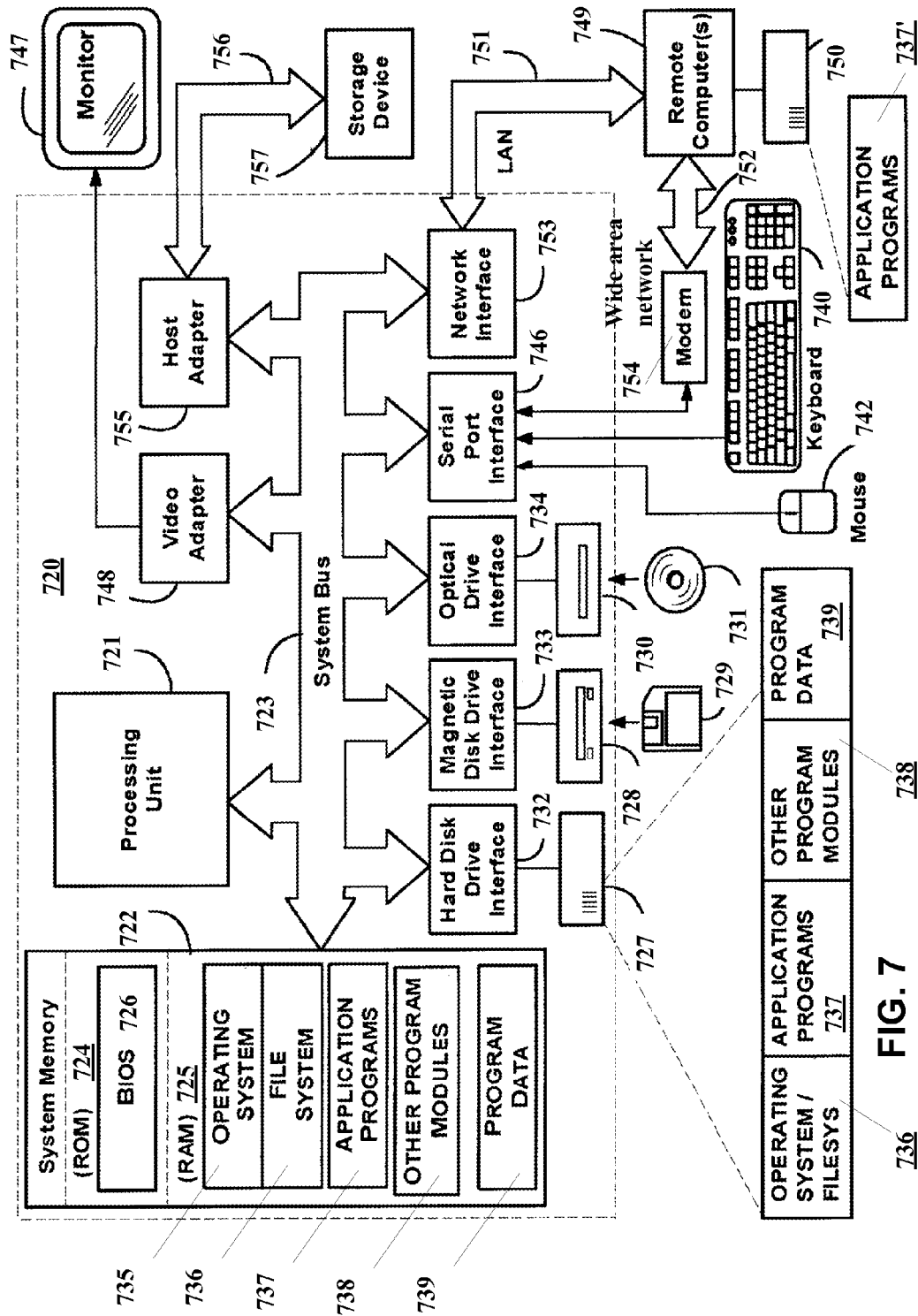
FIG. 7 is a schematic diagram of an exemplary computer or server that can be used in the invention.

With reference to FIG. 7, an exemplary system for implementing the invention includes a general purpose computing device in the form of a personal computer or server 720 or the like, including a processing unit 721, a system memory 722, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read-only memory (ROM) 724 and random access memory (RAM) 725. A basic input/output system 726 (BIOS), containing the basic routines that help to transfer information between elements within the personal computer 720, such as during start-up, is stored in ROM 724. The personal computer 720 may further include a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD-ROM, DVD-ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide non-volatile storage of computer readable instructions, data structures, program modules and other data for the personal computer 720. Although the exemplary environment described herein employs a hard disk, a removable magnetic disk 729 and a removable optical disk 731, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 729, optical disk 731, ROM 724 or RAM 725, including an operating system 735 (preferably Windows™ 2000). The computer 720 includes a file system 736 associated with or included within the operating system 735, such as the Windows NT™ File System (NTFS), one or more application programs 737, other program modules 738 and program data 739. A user may enter commands and information into the personal computer 720 through input devices such as a keyboard 740 and pointing device 742. Other input devices (not shown) may include a microphone, joystick, game pad, satellite dish, scanner or the like. These and other input devices are often connected to the processing unit 721 through a serial port interface 746 that is coupled to the system bus, but may be connected by other interfaces, such as a parallel port, game port or universal serial bus (USB). A monitor 747 or other type of display device is also connected to the system bus 723 via an interface, such as a video adapter 748. In addition to the monitor 747, personal computers typically include other peripheral output devices (not shown), such as speakers and printers. A storage device 757, such as a hard disk drive, a magnetic tape, or other type of storage device is also connected to the system bus 723 via an interface, such as a host adapter 755 via a connection interface 756, such as Integrated Drive Electronics (IDE), Advanced Technology Attachment (ATA), Ultra ATA, Small Computer System Interface (SCSI), and like.

The personal computer 720 may operate in a networked environment using logical connections to one or more remote computers 749. The remote computer (or computers) 749 may be another personal computer, a server, a router, a network PC, a peer device or other common network node, and typically includes many or all of the elements described above relative to the personal computer 720, and may further include a memory storage device 750. The logical connections include a local area network (LAN) 751 and a wide area network (WAN) 752. Such networking environments are commonplace in offices, enterprise-wide computer networks, Intranets and the Internet.

When used in a LAN networking environment, the personal computer 720 is connected to the local area network 751 through a network interface or adapter 753. When used in a WAN networking environment, the personal computer 720 typically includes a modem 754 or other means for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It will be appreciated that the network connections shown are exemplary and other means of establishing a communications link between the computers may be used.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for consolidation of backups, the method comprising:
    selecting a plurality of backups, each backup including offsets that point to data chunks in its backup;
    combining the offsets into a set of offsets that point directly to data chunks in the consolidated backup and to data chunks in previous backups;
    consolidating the selected backups to a new backup that contains the latest content of data chunks;
    updating the set of offsets to point to the data chunks in the new backup;
    storing the updated offsets in the new backup; and
    deleting the selected backups.

2. The method of claim 1, wherein the updating includes deleting offsets to unused data chunks from the selected backups.

3. The method of claim 1, wherein each backup includes a backup map containing the offsets that point to its data chunks.

4. The method of claim 3, wherein the backup maps are based on block structure of a hard disk drive.

5. The method of claim 1, wherein at least some of the selected backups are incremental backups.

6. The method of claim 5, wherein the selected incremental backups are organized into a tree.

7. The method of claim 1, wherein the backups are block-level backups.

8. The method of claim 1, wherein the backups are file-level backups.

9. The method of claim 1, wherein of the selected backups comprise one initial full backup and at least one incremental backup.

10. The method of claim 1, wherein, in the combining step, the addresses from the backup maps of first backup of the selected sequence of backups up to the last created backup is checked.

11. The method of claim 1, wherein the backups are stored as a set of files on a storage device.

12. The method of claim 11, wherein the storage device is any of a hard disk drive, an optical drive, a tape and a network storage element.

13. The method of claim 1, wherein the set of offsets is generated based on a tree structure of the backups.

14. The method of claim 1, wherein, for additional incremental backups that are not part of the selected backups but contain offsets that point to the selected backups, updating the offsets in backup maps of the additional backups.

15. The method of claim 1, further comprising creating an additional backup map or correspondence table that is part of a new incremental backup that contains a set of offsets identifying a correspondence between old offsets and current offsets.

16. The method of claim 1, wherein the offsets correspond to an identifier of the backup and an offset address in the backup.

17. The method of claim 1, the offsets are based on a global offset addressing that is common to all the backups.

18. The method of claim 1, wherein the offsets are generated based on an analysis of a backup map in the prior backup and the data chunk identifier, wherein the data chunk identifier is independent of addresses of data chunks in the backup, and the offsets that refer to data in a map of a prior backup do not change upon consolidation.

19. A non-transitory computer useable storage medium having computer executable program logic stored thereon for executing on a processor, the program logic implementing the steps of claim 1.

20. A system for consolidation of backups, the system comprising:
    a processor;
    a memory; and
    a computer code loaded into the memory and executed on the processor for implementing the steps of claim 1.

* * * * *